M. C. MESSLER

Oct. 27, 1931. CUSHIONING INSOLE FOR BOOTS AND SHOES Re. 18,237

Original Filed Oct. 29, 1927

Inventor
Matie C. Messler
By Jas. H. Schmidt
Atty.

Reissued Oct. 27, 1931

Re. 18,237

UNITED STATES PATENT OFFICE

MATIE C. MESSLER, OF PROVIDENCE, RHODE ISLAND, ASSIGNOR TO MADGE MESSLER, OF PROVIDENCE, RHODE ISLAND

CUSHIONING INSOLE FOR BOOTS AND SHOES

Original No. 1,807,341, dated May 26, 1931, Serial No. 229,637, filed October 29, 1927. Application for reissue filed August 25, 1931. Serial No. 559,252.

This invention relates to a cushioning insole for boots and shoes which can be built in as a part of the shoe or which may be inserted therein.

The invention has for its object to provide a novel insole, which can be used in shoes of ordinary or standard makes as a cushion for the foot for its entire length and as a support for the arches of the foot.

To this end, the cushioning insole is provided with a heel, shank, ball and forepart of sponge or like soft rubber, with the heel, shank and ball portions of substantial thickness and with the forepart of less thickness which gradually tapers from near the ball portion to the end of the toe portion.

The sponge rubber insole may and preferably will be provided with a thin, flexible, backing member, preferably of kid or like thin, flexible leather which is secured to the upper surface of the sponge rubber insole, and, when the latter is to be built into a welt shoe, is made of greater width than the sponge rubber insole so as to overhang the rubber insole and provide side and end flaps for sewing the cushioning insole to the regular insole of a welt shoe.

The tapered forepart extends from the front end of the toe portion to near the ball portion and preferably slightly beyond a plane transversely of the insole through the ball portion and substantially at right angles to the longitudinal axis of the insole, and beyond said transverse plane the ball portion is tapered laterally to form side portions of less thickness than the intermediate portion and to constitute the latter a supporting member for the metatarsal arch of the foot as will be described.

The particular features of the invention will be pointed out in the claims at the end of this specification.

Figure 2:
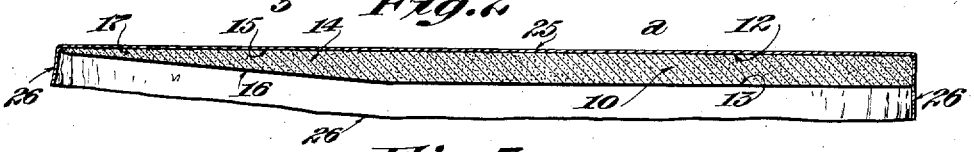
Fig. 2 is a longitudinal section of the insole shown in Fig. 1 before being built into the shoe.
Figure 3:
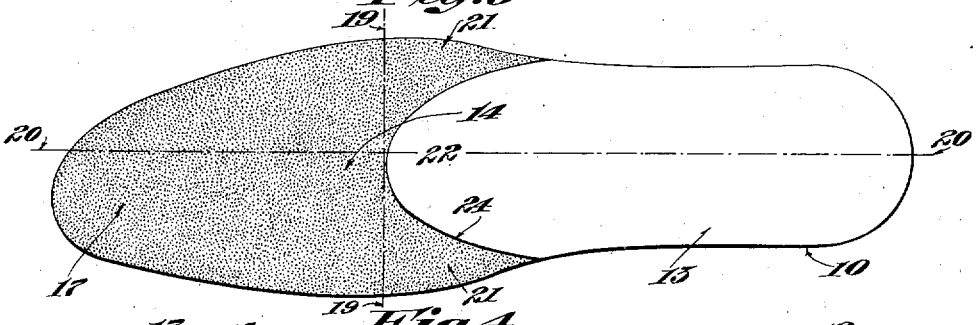
Figure 4:
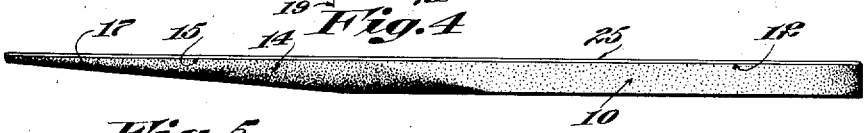

Fig. 3, a plan view of the insole shown in Fig. 2 inverted;

Fig. 4, a side elevation of a modified insole, and

Figure 1:
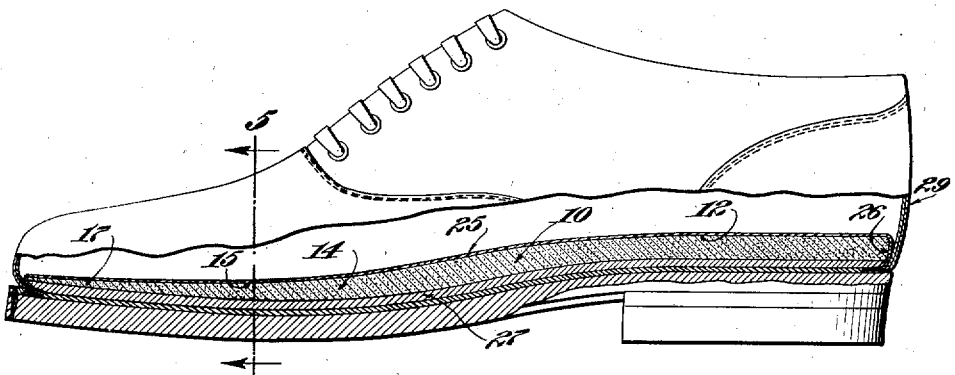
Fig. 1 represents in side elevation and section a welt shoe having built therein a cushioning insole embodying this invention.
Figure 5:
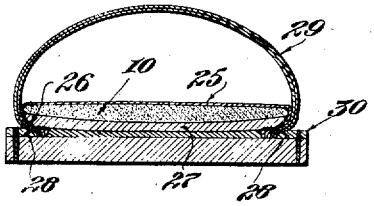

Fig. 5, a cross section on the line 5—5, Fig. 1.

Referring to the drawings, *a* represents the improved sponge rubber insole comprising a rear portion 10 of substantial thickness and having substantially parallel, flat upper and lower surfaces 12, 13, and a front portion 14 having a substantially flat upper surface 15 and a substantially long tapering lower surface 16, which extends rearwardly from the end of the toe portion 17 of the insole to near and preferably beyond a plane transversely of the insole through the ball or widest portion thereof, said plane being indicated by the dotted line 19.

This tapered lower surface 16 at the longitudinal axis of the insole, represented by the dotted line 20, extends from the front edge of the insole to near the ball portion, and preferably, though not necessarily, may extend slightly beyond the transverse plane 19 and merge with the lower surface of the rear portion 10 in proximity to said transverse plane 19, and on opposite sides of the longitudinal axis 20 of the insole. It is also preferable but not requisite that the tapered lower surface is carried rearwardly of the transverse plane 19 to merge with the bottom surface of the rear portion 10 at the line 24 as shown in Fig. 3.

By extending the taper of the front member on opposite sides of the long axis of the insole, the latter is provided with a ball portion having laterally tapering side portions 21 and an intermediate portion 22 of greater thickness and of substantially the same thickness as the shank and the heel parts of the rear portion 10 of the insole. The thicker intermediate part 22 of the ball portion is sufficiently narrow to permit it to serve as a support for the intermediate bones of the metatarsal arch, while the laterally tapered sides 21 of the ball portion permit the joints of the big and little toes to be supported at a lower level than the intermediate bones of the metatarsal arch.

It should be clear, however, that the invention in its broadest aspect is not dependent on the side taperings 21, 21 of Fig. 3.

By reference to Fig. 3, it will be observed that the improved insole is provided with a rear portion 10 comprising the heel, shank and ball portion and that the ball portion is provided with tapered sides which extend downward from an intermediate portion and laterally thereof to the side edges of the ball portion of the insole, and that the intermediate ball portion 22 is of substantially the same thickness as the shank and heeel portions and is provided with a curved or substantially curved outline or edge 24 which extends rearwardly of the plane 19 through the widest part of the insole.

It will be observed that the insole is provided with a front member which extends from near the ball portion to the front end of the toe portion. As shown in Fig. 3, this front member merges with the laterally tapering sides 21 of the ball portion. Preferably the tapered front member 14 extends from the front end of the toe portion beyond the transverse plane 19 through the widest portion of the insole, and gradually diminishes in thickness from the front extremity of the thicker intermediate part 22 of the ball portion to the front end of the insole.

As a result a shoe of standard or ordinary construction having a toe portion of normal or relatively limited height, and consequently of limited head room for the reception of the toes of the foot as now exists in the standard makes of shoes, may be provided with a cushion for the toes, without detrimental effects to the wearer of the shoe, such as crowding the toes and causing them to become heated and swollen, with resultant pressure upon the toe nails, with liability of producing ingrowing nails, and attendant discomfort and danger to the wearer.

The cushioning rubber insole may and preferably will have applied to its upper surface a thin backing member 25 of kid leather or other suitable material, which may be affixed to said surface in any suitable manner, and when the insole is to be built into a welt shoe as shown in Figs. 1 and 5, the backing member 25 is made wide enough to form side and end flaps 26, which are secured to the regular insole 27 by the inseam stitches 28 which sew the upper 29 and welt 30 to the insole 27.

When the cushioning rubber insole *a* is to be inserted into the shoe, the flaps 26 of the backing or covering member 25 are omitted as represented in Fig. 4.

From the above description, it will be seen that a boot or shoe having a cushioning insole such as herein described may be worn with maximum comfort to the wearer, as the foot is cushioned from toe to heel of the foot, and at the same time the arches are supported and held up in the desired manner, and these desirable results are obtained in a shoe of standard make and style having a toe portion of normal height, without discomfort or danger to the wearer.

While it is preferred to make the cushioning insole of sponge rubber, it is not desired to limit the invention in this respect, as any other soft and yielding material, such as crepe rubber may be used to advantage.

What I claim is:

1. A cushioning insole for boots and shoes composed of soft rubber and provided with heel and shank portions of substantial and uniform thickness, a front member of substantial length tapering from the front end of the toe portion to near a transverse plane through the insole at its widest portion, and a ball portion intermediate said tapering front member and said shank portion and having tapering sides extended rearwardly from said transverse plane and a center portion intermediate said tapering sides and of substantially the same thickness as the shank and heel portions, said center portion having on one surface a curved edge or outline at the rear of said transverse plane and formed by said front portion and said tapering sides.

2. A cushioning insole of soft rubber for boots and shoes provided with heel and shank portions of substantial and uniform thickness and a ball portion having a part thereof intermediate the side edges of the ball portion of substantially the same thickness as the shank and heel portions and having thinner side portions tapering downward laterally away from said intermediate part and extended rearwardly of a plane transversely of the insole through said intermediate part of said ball portion, said heel, shank and intermediate ball portions having normally substantially flat upper and lower surfaces, and being of substantially and uniform thickness to enable the heel portion to be substantially depressed by the heel of the foot to cushion the said heel, said shank portion conforming to and supporting the longitudinal arch of the foot, when said heel portion is depressed.

3. A cushioning insole of soft rubber for boots and shoes provided with heel and shank portion of substantial and uniform thickness and a ball portion having a part thereof intermediate the side edges of the ball portion of substantially the same thickness as said shank and heel portions and having thinner side portions tapering downward laterally away from said intermediate part and extended rearwardly of a plane transversely of the insole through said intermediate part of said ball portion and having a downward tapering part extended forward from the foremost end of the thicker intermediate part of said ball portion, said heel, shank and intermediate ball portions having substantially flat upper and lower surfaces, and being of substantial and uniform thickness to enable the heel portion to be substantially depressed by the heel of the foot to cushion said heel, said shank portion conforming to and supporting the longitudinal arch of the foot, when said heel portion is depressed.

4. A cushioning insole of soft and compressible rubber for boots and shoes provided with heel and shank portions of substantial and uniform thickness and a ball portion having a part thereof of substantially the same thickness as the shank and heel portions, said insole tapering from the intermediate part of the ball portion to reduced edges, said heel and shank portions and a part of the ball portion normally having substantially flat upper and lower surfaces, and being of substantial and uniform thickness to enable the heel portion to be substantially depressed by the heel of the foot to cushion the said heel, said shank portion conforming to and supporting the longitudinal arch of the foot, when the heel portion is depressed.

5. A cushioning insole of soft and compressible rubber for boots and shoes provided with heel, shank and ball portions, the greater part of which portions are of substantial and uniform thickness, and a front portion extending from the ball portion, the forward portion of the insole tapering from the thick part of said ball portion to reduced edges, said heel, shank, and thick ball portions normally having substantially flat upper and lower surfaces and being of substantial and uniform thickness to enable the heel portion to be substantially depressed by the heel of the foot to cushion the said heel, said shank portion conforming to and supporting the longitudinal arch of the foot, when the heel portion is depressed.

6. A cushioning insole of soft and compressible rubber for boots and shoes provided with heel and shank portions of substantial and uniform thickness, an intermediate ball portion of substantially the same thickness as the shank and heel portions, and a front portion extending forward from the front of the ball portion to the edges of the insole, said front portion tapering from the intermediate ball portion to the edge of the insole, said heel, shank and intermediate ball portions normally having substantially flat upper and lower surfaces, and being of substantial and uniform thickness to enable the heel portion to be substantially depressed by the heel of the foot to cushion the said heel, said shank portion conforming to and supporting the longitudinal arch of the foot when said heel portion is depressed.

In testimony whereof, I have hereunto set my signature.

MATIE C. MESSLER.